United States Patent [19]
Erdmann et al.

[11] 3,846,790
[45] Nov. 5, 1974

[54] INTRUSION DETECTION SYSTEMS
[75] Inventors: David P. Erdmann, Hopkins; Dennis L. Kurschner, Minnetonka, both of Minn.
[73] Assignee: Honeywell, Inc., Minneapolis, Minn.
[22] Filed: June 8, 1973
[21] Appl. No.: 368,162

[52] U.S. Cl. ............. 340/258 D, 324/3, 340/258 C, 340/261
[51] Int. Cl. .......................................... G08b 13/24
[58] Field of Search ........ 340/258 R, 258 C, 258 D, 340/261, 38 L; 324/3, 41

[56] References Cited
UNITED STATES PATENTS

| | | | |
|---|---|---|---|
| 3,543,261 | 11/1970 | Burney | 340/258 R |
| 3,599,145 | 8/1971 | Ando et al. | 340/38 L |
| 3,611,341 | 10/1971 | Craig et al. | 340/258 D |
| 3,634,843 | 1/1972 | Corris | 340/258 C |
| 3,696,369 | 10/1972 | Laymon et al. | 340/258 D |
| 3,717,864 | 2/1973 | Cook et al. | 340/258 D |
| 3,737,768 | 6/1973 | Lazenby et al. | 324/3 |
| 3,745,552 | 7/1973 | Wilt | 340/258 D |

Primary Examiner—David L. Trafton

[57] ABSTRACT

A system for sensing seismic and magnetic disturbances, comprising a segmented transducer, such as a line sensor, and electronic circuitry for processing the signals developed by the segmented transducer. The segmented transducer comprises sets of windings wrapped around a ferromagnetic core. Currents are induced in transducer windings as a result of magnetostriction when seismic disturbances or stresses cause strains in the ferromagnetic core. Currents are also induced in the transducer windings by magnetic field disturbances caused by external ferrous objects. Electronic signal processing circuitry associated with the transducer extracts information from the induced seismic and magnetic signals and activates an alarm if the information meets predetermined criteria. Important criteria used include whether the seismic signals are impulsive, whether the magnetic or stress disturbances are localized, and whether specific thresholds of magnetic and stress activity are reached.

12 Claims, 9 Drawing Figures

| SECTION(S) DISTURBED | ABR | BCR |
|---|---|---|
| 1 | H | L |
| 2 | H | H |
| 3 | L | H |
| 1 & 2 | H | L |
| 2 & 3 | L | H |
| 1, 2 & 3 | L | L |

Rows 1–5: DETECT CONDITIONS
Row 6 (1, 2 & 3): NON DETECT CONDITION

FIG. 8

INTRUSION DETECTION SYSTEMS

BACKGROUND OF THE INVENTION

This invention pertains to intrusion detection systems, particularly intrusion detection systems which utilize a segmented sensor or plurality of sensors which are sensitive to both seismic and magnetic disturbances in distinct segments of a boundary.

Prior art intrusion detection systems have typically used either a series of seismic point sensors or a single magnetic line sensor to detect intrusion. An example of a system using geophones as seismic point sensors is shown in U.S. Pat. Application Ser. No. 262,888, filed June 14, 1972. The information available from such systems is limited, and failure of these systems to provide sufficient intelligence to distinguish between noise, far-field disturbances and actual intrusions may result in nuisance alarms.

An example of a segmented sensor which can be used to provide both magnetic and seismic signals is shown in U.S. Pat. Application Ser. No. 218,102, filed Jan. 17, 1972 now U.S. Pat. No. 3,747,036. The present invention is apparatus which will effectively use magnetic and seismic information from a plurality of boundary segments to gain information which decreases the probability of nuisance alarms while increasing the probability of detecting actual intrusions. The present invention is therefore particularly suited for use with a sensor of the type shown in Application Ser. No. 218,102.

Two drawbacks of prior art systems have been: (i) their failure to accurately sense the lack of localization of a disturbance and inhibit intrusion alarm when the disturbance is not sufficiently localized to represent an intrusion, and (ii) their failure to use information about the impulsive or non-impulsive character of the disturbances to vary the level of disturbance required to activate the alarm.

It is therefore a principal object of the present invention to provide intrusion detection apparatus which detects whether or not a disturbance is localized and inhibits the alarm if the disturbance is not sufficiently localized to represent human intrusion.

Another important object is to provide intrusion detection apparatus which determines whether a detected seismic disturbance is impulsive in nature and uses the determination to vary the threshold of magnetic disturbance required to actuate an alarm.

Still another object is to provide an improved intrusion detection system usable with signals indicative of both seismic and magnetic disturbances.

Yet another object is to provide an improved intrusion detection system which utilizes signals indicative of the level of disturbances in a number of distinct segments of a boundary.

SUMMARY OF THE INVENTION

These objects are achieved by intrusion detection apparatus for processing a plurality of sensor signals, each of which is indicative of the level of disturbances in a distinct segment of a predetermined boundary across which intrusions are being detected. Means for receiving and averaging each of the sensor signals with time are provided. Each of the time averaged sensor signals is then provided to threshold detection means and array comparison means. The threshold detection means detects when one of the averaged sensor signals exceeds a predetermined amplitude, and generates an activate signal upon such detection. The array comparison means compares the relative amplitudes of the time averaged sensor signals with one another and generates an inhibit signal if these relative amplitudes are within a predetermined range. Alarm control logic for the apparatus responds to the signals generated by the array comparison means and threshold detection means to produce an alarm actuation signal at times when said activate signal is generated but said inhibit signal is not being generated.

BRIEF DESCRIPTION OF THE DRAWINGS

Other objects and advantages of the invention will become apparent upon reading the following detailed description and upon reference to the drawings in which:

FIG. 8 is a truth table which illustrates the criteria applied to the magnetic signals by the array comparison portion of the apparatus;

The improved intrusion detection apparatus has been developed for use with a sensor providing information about both seismic and magnetic disturbances along a predetermined boundary of a protected area. Although a specific line sensor usable with this invention is shown in FIGS. 1 and 2, any segmented sensor or combination of individual sensors which provides information about magnetic and seismic disturbances in a plurality of specific segments of a boundary would be suitable for use with the preferred embodiment shown in block diagram form in FIG. 3.

Figure 1:
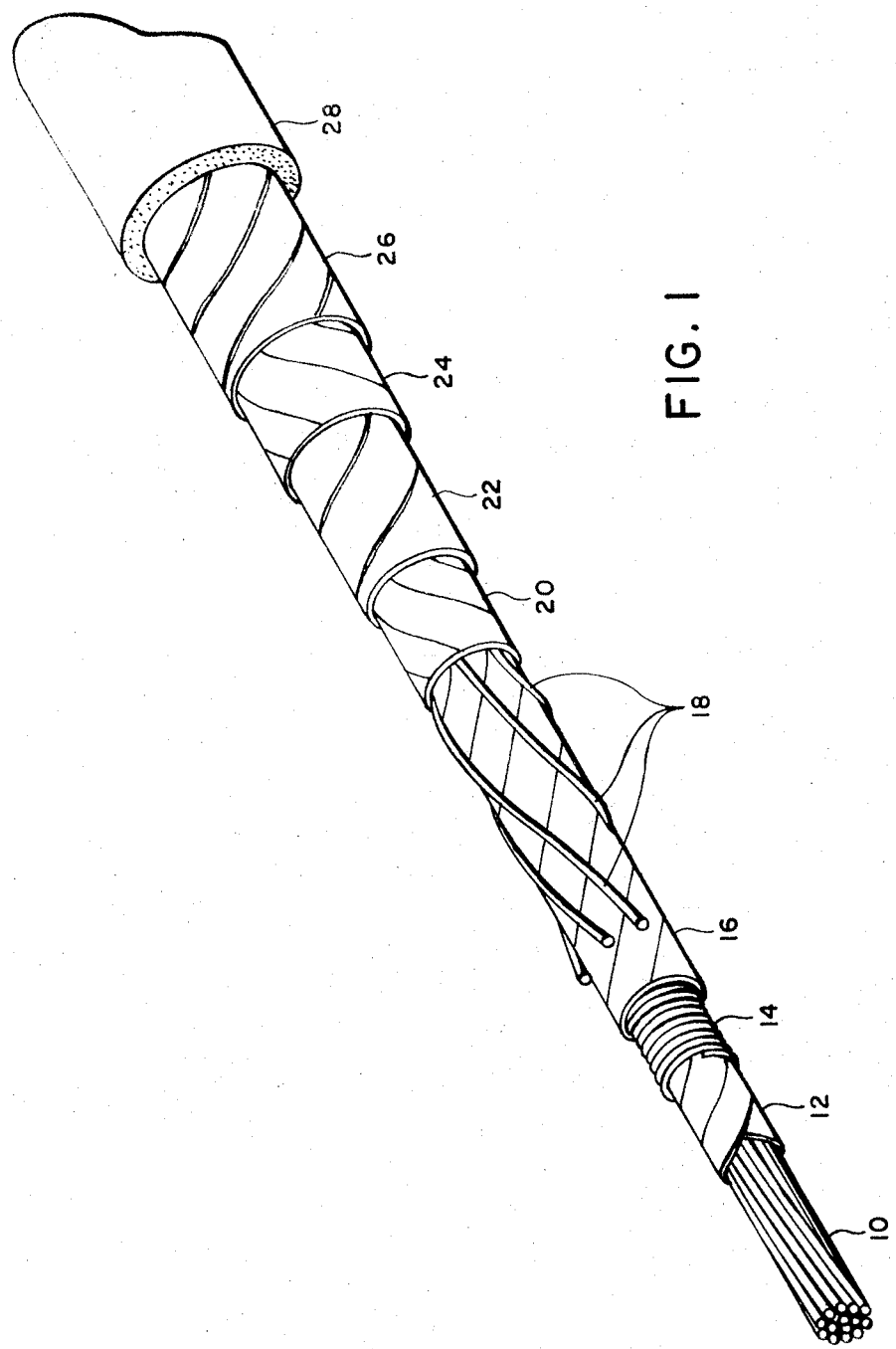
FIG. 1 illustrates the physical configuration of one segment of a line sensor suitable for use with the intrusion detection apparatus.
Figure 2:
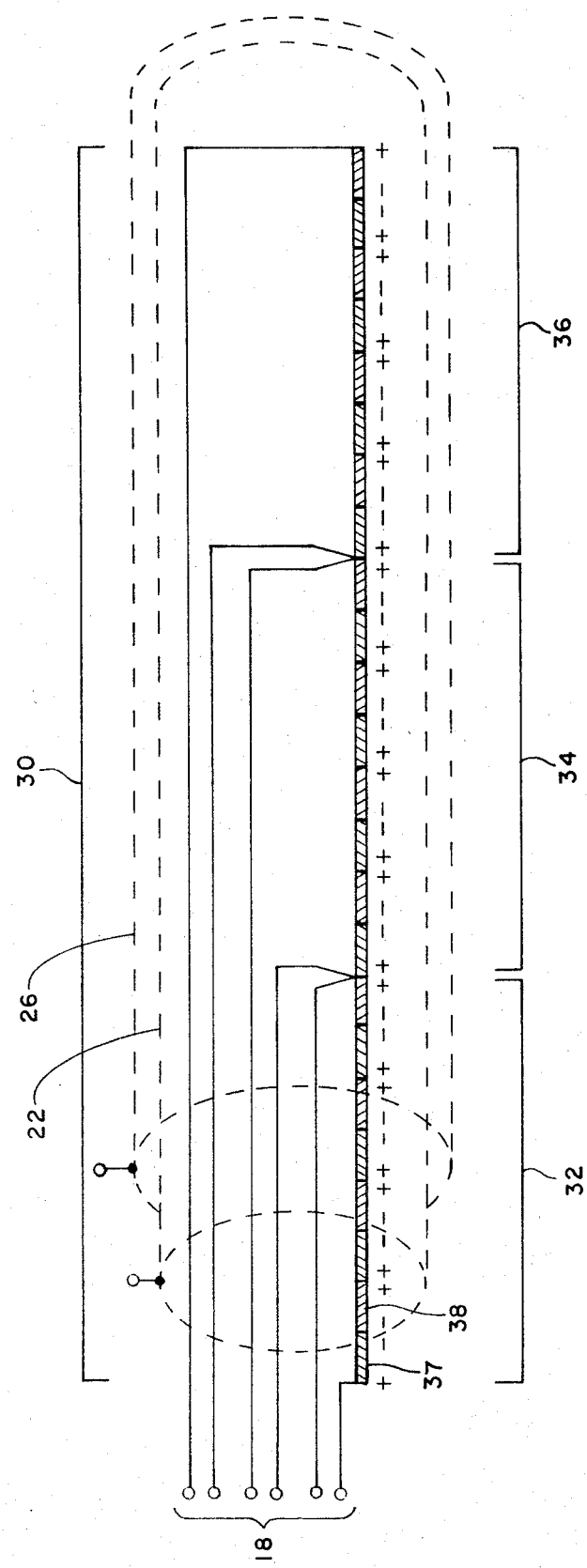
FIG. 2 illustrates the electrical configuration of a three-segment line sensor suitable for use with the improved intrusion detection apparatus.

The transducer shown in FIGS. 1 and 2 is a line sensor which takes the form of a line or cable. The transducer of FIGS. 1 and 2 is described in detail in U.S. Pat. Application Ser. No. 218,102, referred to above. It is described here only to simplify the task of understanding the operation of the intrusion detection apparatus of the present invention.

The physical structure of one portion of a line sensor is shown in FIG. 1. The portion shown cutaway layer by layer has a core 10 of ferromagnetic material, a first insulative layer 12, a helical winding 14, a second insulative layer 16, a set of electrical leads 18, two for each segment, a third insulative layer 20, a first electrical shield material 22, a fourth insulative layer 24, a second electrical shield 26, and an outer jacket or protective sheath 28.

In one successful embodiment of this sensor, the ferromagnetic material for the core 10 was constructed of 19 strands of 0.042 inch Blendalloy 25–8005, while the first insulative layer 12 was made of Kapton. Insulative layers 16, 20, and 24 were dual layers, comprising one layer of Teflon and one layer of Kapton. Helical winding 14 was constructed of AWG 30, Celanese covered, insulated magnet wire. Electrical shields 22 and 26 were 0.004 inch thick cylindrical layers of silver. Finally, protective sheath 28 was constructed of extruded polyurethane.

One successful electrical configuration of the line sensor is illustrated in FIG. 2. That figure shows a line sensor 30 having three segments 32, 34, and 36. Segments 32, 34, and 36 are electrically isolated. Each segment is made up of an even number of sections, in this case eight, connected in electrical series. Two illustrative sections which are a portion of segment 32 are labelled with reference numerals 37 and 38. Each pair of sections acts as a magnetic gradiometer and alternate sections such as 37 and 38 have oppositely wound coils 14. The alternation of oppositely wound sections along the length of sensor 30 is indicated by plus and minus signs showing opposite potentials across adjacent sections. Also shown in FIG. 2 as two dotted line cylinders are layers of electrical shielding 22 and 26. The use of a number of alternate oppositely wound sections in each segment aids in cancelling or rejection of far-field noise while effectively enhancing near-field or local effects through a mechanism described in U.S. Pat. Application Ser. No. 218,102, referred to above.

In the line sensor of FIGS. 1 and 2, the disturbance information is obtained in the following way. Ferromagnetic core 10 is strained by each seismic disturbance. The strain in the ferromagnetic material results in magnetic field changes due to magnetostriction. The resultant magnetic field changes induce electrical signals in windings 14. Magnetic field changes of a different frequency are caused by movement of ferrous objects in the vicinity of segments of sensor 30. These magnetic field changes due to magnetic disturbances induce further electrical signals in windings 14. Thus electrical signals representing both seismic and magnetic disturbances are generated in the same winding and a mixed signal indicative of these disturbances is obtained. Since the seismic and magnetic portions of the signal lie in different frequency bands, they may be separated by appropriate filtering.

Figure 3:
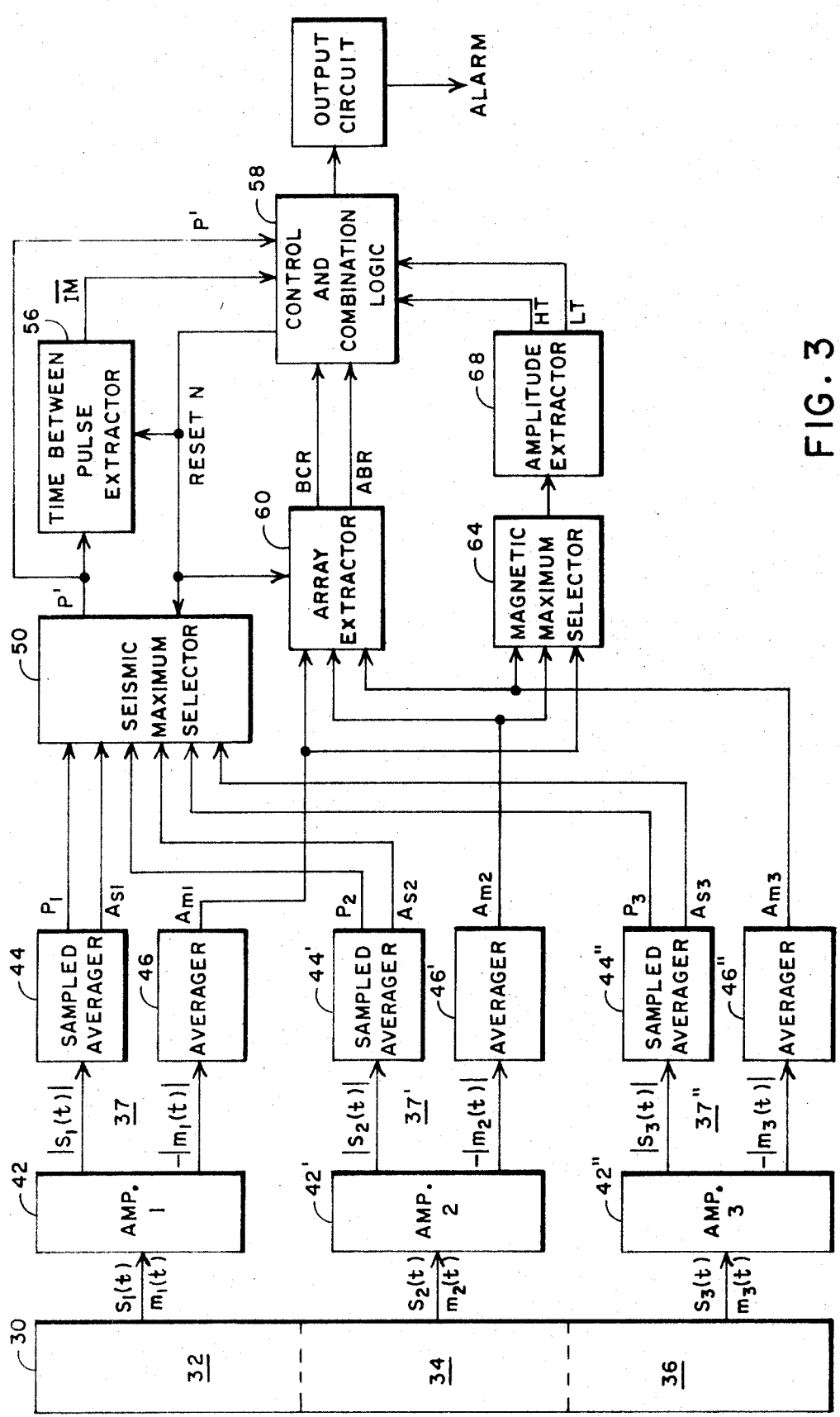
FIG. 3 is a functional block diagram of the intrusion detection apparatus.

FIG. 3 shows a functional block diagram of an improved intrusion detection system built using one embodiment of the present invention. FIG. 3 shows line sensor 30 as a block having three segments 32, 34, and 36 separated by dashed lines.

Electrical signals indicative of the combined seismic and magnetic disturbances in each segment of the boundary covered by segments 32, 34, and 36 are represented by labelled arrows directed outwardly from each of the segments. As shown in FIG. 3, the seismic and magnetic signals from segments 32, 34, and 36 are $s_1(t)$ and $m_1(t)$; $s_2(t)$ and $m_2(t)$; and $s_3(t)$ and $m_3(t)$ respectively. Since the portion of the apparatus which amplifies, filters, and averages the signal from each line sensor segment is virtually identical to that of the others, only the elements associated with segment 32 will be described. The subscripts adopted above will apply to the signals from the respective segments throughout. Segment 32 is connected to a signal processing channel generally designated 37. Signal processing channel 37 includes a amplifier 42, a sampled averager 44, and an averager 46. Amplifier 42 amplifies the combined signal received from segment 32 and applies appropriate filtering which essentially separates the seismic and magnetic portions of the signal from one another. Amplifier 42 has two outputs: a signal representative of the absolute value of the seismic disturbance $|s_1(t)|$; and a signal representative of the negative of the absolute value of the magnetic disturbance $-|m_1(t)|$. The output of amplifier 42 carrying $|s_1(t)|$ is connected to sampled averager 44. Sampled averager 44 functions to generate a normalized pulse at an output labelled $P_1$ in response to each seismic disturbance above a predetermined threshold or level. In addition, averager 44 generates a signal at an output labelled $A_{s1}$ which represents a time average of the seismic disturbances above the same predetermined threshold. The signal on output $A_{s1}$ is a "sampled average" in the sense that only disturbances greater than the predetermined threshold are averaged. The other output of amplifier 42 carries the signal $-|m_1(t)|$ to averager 46 which generates a time average of the signal at output $A_{m1}$. The signal on output $A_{m1}$ is said to be an unsampled average in that there is no predetermined threshold level that has to be exceeded by the magnetic disturbances before they are averaged.

Segments 34 and 36 each have elements which are functionally equivalent to the role of amplifier 42, sampled averager 44, and averager 46 with respect to segment 32. These equivalent elements include amplifiers 42' and 42'', sampled averagers 44' and 44'', and averagers 46' and 46''. In addition, the channels processing signals from segments 34 and 36 are labelled 37' and 37'' respectively. Channel 37', associated with line section 34, generates pulses $P_2$, level $A_{s2}$, and level $A_{m2}$; channel 37'', associated with section 36, generates pulses $P_3$, level $A_{s3}$, and level $A_{m3}$.

The pulses at outputs $P_1$, $P_2$, and $P_3$ and the voltage levels present at outputs $A_{s1}$, $A_{s2}$, and $A_{s3}$ contain seismic information. The pulses at $P_1$, $P_2$, and $P_3$ represent seismic disturbances above a predetermined threshold. The voltage levels at $A_{s1}$, $A_{s2}$, $A_{s3}$ represent the average intensity of the seismic disturbances. The voltage levels at $A_{m1}$, $A_{m2}$, and $A_{m3}$ contain magnetic information representing the average intensity of the magnetic disturbances. The seismic information is now processed in a seismic maximum selector 50 while the magnetic information is processed in an array extractor 60 and a magnetic maximum selector 64.

The seismic maximum selector 50 directs one of the outputs $P_1$, $P_2$, or $P_3$ associated with the sampled average from $A_{s1}$, $A_{s2}$, or $A_{s3}$ which is of the largest amplitude to the output P'. As an example, if the amplitude of output signal $A_{s1}$, is largest of the three sampled average signals, maximum selector 50 directs the pulses from output $P_1$ to the output P'. The pulses generated at P' are applied to the input of a time-between-pulse extractor 56 and a control and combination logic block 58.

The time between successive pulses generated at output P' quite clearly is related to the nature of the disturbance causing the pulses. For example, it is known that the human body alone does not generate seismic disturbances spaced less than about 60 milliseconds apart. This is a well established upper limit upon the speed of human movement. From this knowledge, it can be determined if a human has caused a seismic disturbance by determining the period between successive disturbances. If the period is less than 60 milliseconds it is unlikely that a human is involved. Time-between-pulse extractor 56 performs this function. It is connected to output P' to receive pulses therefrom and generates an output logic signal or pulse at an output labelled $\overline{IM}$ (for nonimpulsive or non-human) if it detects or counts a predetermined number of pulses spaced less than 60 milliseconds from one another.

Since the average levels $A_{s1}$, $A_{s2}$, and $A_{s3}$ will change slowly relative to the frequency of the disturbance, the pulses from output P' will occur in groups or packets with all pulses in a group associated with the same line sensor segment and therefore the same source of disturbance (assuming there is a simple source of disturbance associated with a line section at any one time). Each pulse group is processed by extractor 56 to determine whether the source of disturbances is not impulsive, i.e., not human. This seismic disturbance information is combined with the information obtained from the magnetic disturbance signals.

The averaged magnetic disturbance signals from outputs $A_{m1}$, $A_{m2}$, and $A_{m3}$ are applied to the input of an array extractor 60. The output of extractor 60 is a pair of outputs labelled BCR and ABR. Array extractor 60 compares each of two of the three signals received with a friction of the sum of the remaining two. If these two comparisons indicate that each of the two signals is larger than the sum of the remaining two multiplied by the fraction, then the logic level of both outputs will be "L" or low level. In this condition, the double "L" level signal should inhibit the alarm, since it is assumed that far-field effects have caused the disturbance. The outputs BCR and ABR are applied to the control and combination logic block 58 for precisely this purpose. A further discussion of the array extractor response occurs in conjunction with FIG. 8.

The magnetic disturbance signals from $A_{m1}$, $A_{m2}$, and $A_{m3}$ are also applied as inputs to a magnetic maximum selector 64. From the signals received by selector 64, the signal with the greatest amplitude is selected and developed at the output of selector 64. The output of selector 64 is then applied to the input of an amplitude extractor 68. Two binary signal outputs, labelled HT and LT, form the output of extractor 68. If the amplitude of the magnetic disturbance signal selected by selector 64 is greater than a first predetermined upper threshold, the logic level signals from both the HT and LT outputs will be "H" or high. If the amplitude is greater than a second predetermined lower threshold, but less than the upper threshold, the LT logic level will be high while the HT logic level will be low. Finally, if the selected signal amplitude is less than either the upper or lower thresholds, the logic levels at both HT and LT outputs will be low. The logic signals at HT and LT are also applied as inputs to the control and combination logic block 58.

The output of control and combination logic block 58 uses the logic signals received from time-between-pulse extractor 56, seismic maximum selector 50, array extractor 60 and amplitude extractor 68 to generate an actuate signal for an alarm in appropriate circumstances. If both outputs of array extractor 60 are "L", indicating that the level of magnetic disturbance in each segment is within a fraction of that in each other segment, the two "L" logic levels act as an inhibit signal to prevent block 58 from generating the actuate signal. If at least one output of array extractor 60 is "H" or high level, then the alarm may be actuated by the proper combination of signals from extractors 56 and 68. When the output of time-between-pulse extractor 56 indicates a non-impulsive (non-human) seismic disturbance, trip of the upper threshold or HT output of extractor 68 is required to cause an actuate signal. On the other hand, if no non-impulsive seismic disturbance is present, the low threshold magnetic disturbance output (LT) of amplitude extractor 68 will be sufficient to actuate the alarm.

Figure 4:
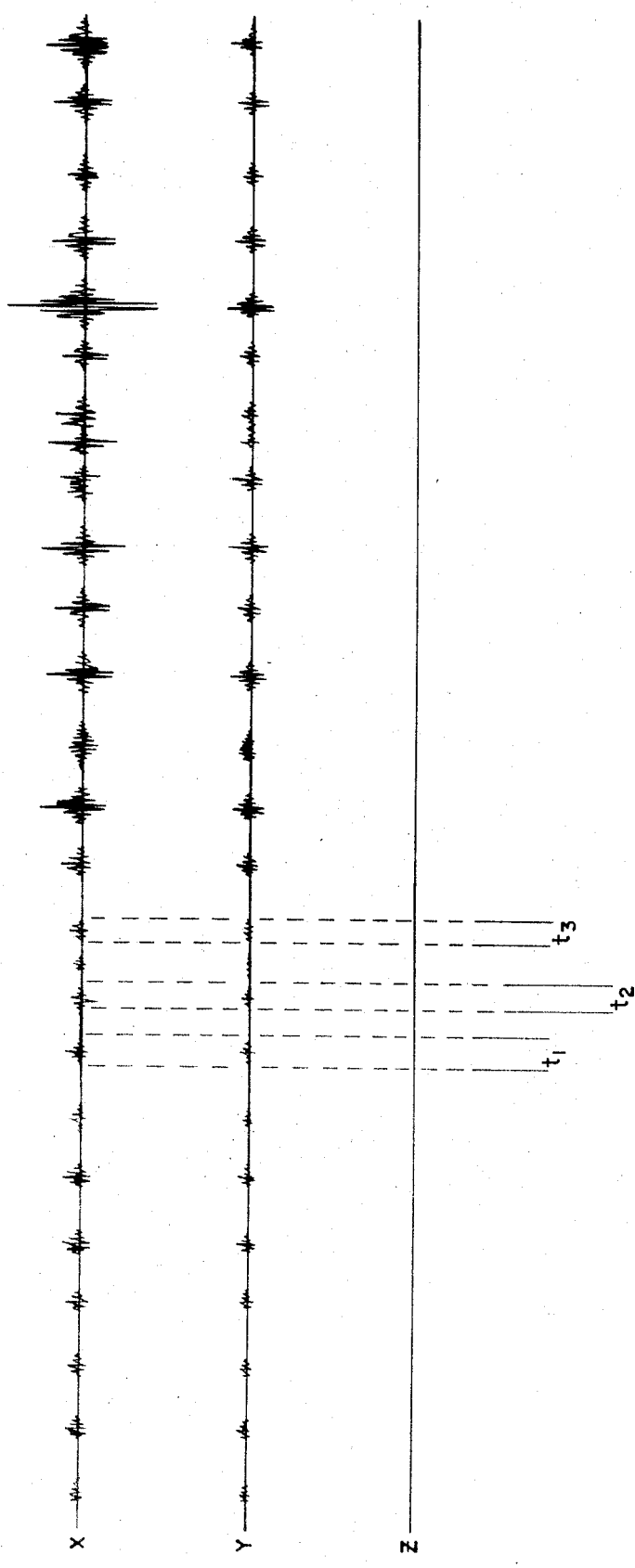
FIG. 4 shows illustrative seismic waveforms which might be developed in the segments of a line sensor of the type shown in FIGS. 2 and 3 in response to disturbances created by a human intrusion.

If the disturbances meeting the above criteria are sporadic or relatively discontinuous, an alarm signal will be generated every 3 seconds. If the disturbances are relatively continuous (less than about 3 seconds apart) an alarm is generated only after 12 seconds of continuous disturbances. In other words an alarm is generated 3 seconds after the last sufficient disturbance, or after 12 seconds of continuous disturbances, whichever occurs first. So that the response of the system to the signals from segments 32, 34, and 36 may be better understood, FIG. 4 shows three signals which represent the preamplified seismic signals caused by a human intruder crossing one of the end segments of the line sensor. Waveforms X, Y, and Z could represent the preamplified seismic signals from sections 32, 34, and 36 respectively. Since waveform X has the greatest amplitude an intruder is crossing the line sensor segment which produces that waveform. Consecutive sampled averaging time periods have been designated $t_1$, $t_2$, and $t_3$. As indicated above these time periods are started by the sampled averagers when a predetermined amplitude is exceeded. A typical time period for sample is about 250 milliseconds.

Figure 5:
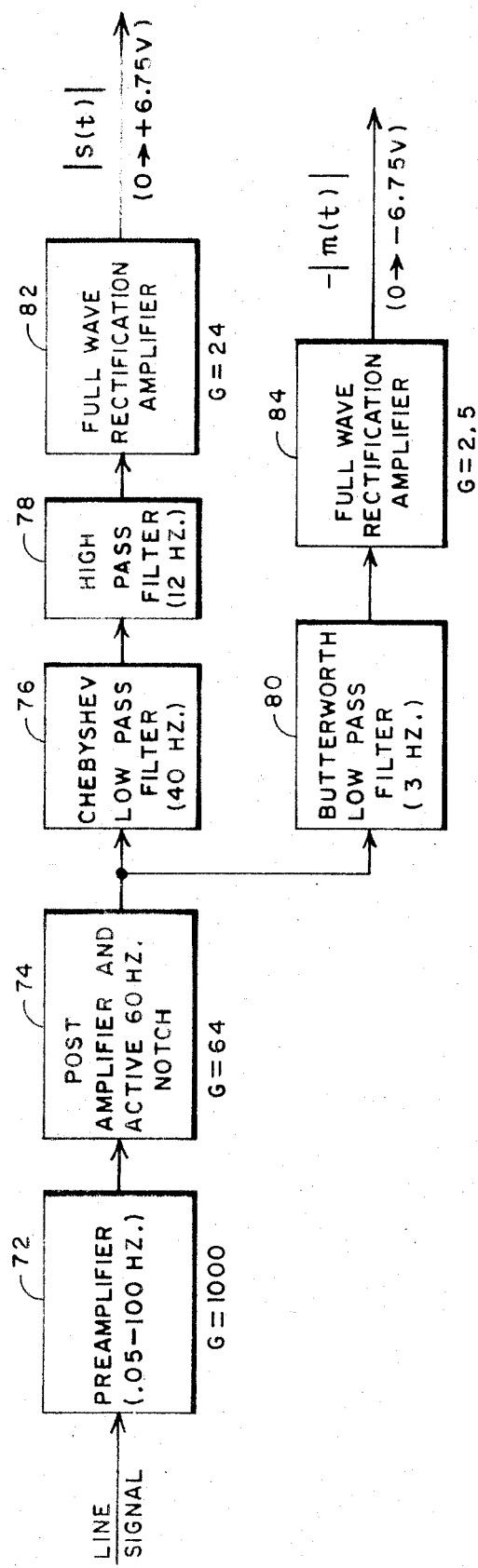
FIG. 5 is a block diagram showing, in more detail, a dual channel seismic and magnetic amplifier used in the apparatus of FIG. 1.

The individual elements comprising one embodiment of the system shown in FIG. 3 will now be described in greater detail. Dual-channel amplifier 42 of FIG. 1 is shown in the block diagram of FIG. 5. The signal from line sensor segment 32 is shown at the left of FIG. 5 and is labelled "line signal". The magnitude of the combined line signal from segment 32 is increased by two successive stages of amplification, a pre-amplifier 72 and a post-amplifier 74. Post-amplifier 74 includes an active 60-cycle notch filter which attenuates 60-cycle variations which the combined line signal may have picked up from internal or external power sources (not shown). The output of post-amplifier 74 is applied to the inputs of two filtering networks. The first filtering network comprises a Chebyshev low-pass filter 76 followed by a high-pass filter 78. The second filtering network is a Butterworth low-pass filter 80. The output signal from filter 78 represents the seismic signals, which typically have frequency components in the range of 10 to 40 Hz. The output of filter 80 represents the magnetic or low frequency signals, which typically have frequency components in the range of 0.05 to 3 Hz. The seismic disturbance signals from filter 78 are applied to the input of a full-wave rectification-amplifier 82 while the magnetic disturbance signals are applied to the input of a second full-wave rectification-amplifier 84. One successful embodiment of dual-channel amplifier 42 functioned satisfactorily with components having the following characteristics: preamplifier 72 with gain of 1,000, frequency range of 0.05 to 100 Hz; post-amplifier 74 with gain of 64; filter 76 with cutoff frequency of 40 Hz; filter 78 with cutoff frequency of 12 Hz; filter 80 with cutoff frequency of 3 Hz; rectifier-amplifier 82 with gain of 24; and rectifier-amplifier 84 with gain of 2.5. In that embodiment, the seismic signal output of rectifier-amplifier 82, designated $|s(t)|$, varied between 0 and +6.75 volts. The magnetic signal output of rectifier-amplifier 74, designated $-|m(t)|$, varied between 0 and −6.75 volts. Each of the amplifier 42, 42', and 42'' of FIG. 1 may be constructed using the components shown in block form in FIG. 5.

Figure 6:
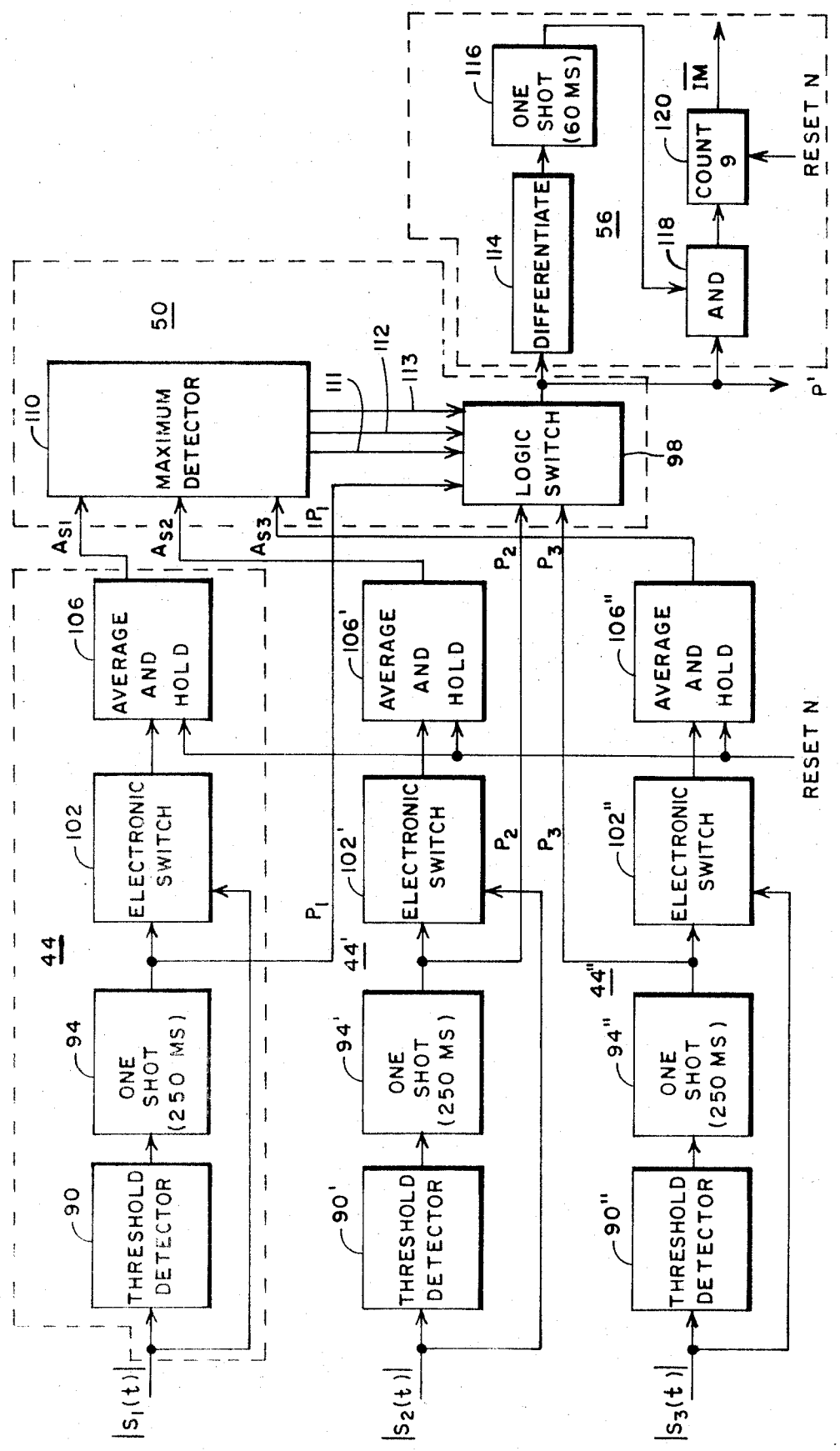
FIG. 6 is a block diagram, illustrating, in more detail, the seismic signal processing portion of the apparatus.

Specific embodiments of the sampled averagers 44, 44', and 44'', seismic maximum selector 50, and time-between-pulse extractor 56 appear in FIG. 6. Since each of the sampled averagers shown in FIG. 6 is identical to the others, the operation will be explained only once. The components which comprise averager 44 are surrounded by a dashed line block in FIG. 6. The seismic signal $|s_1(t)|$ from the output of rectifier-amplifier 82 is applied to the inputs of threshold detector 90 and an electronic switch 102. The seismic signal will ultimately pass through electronic switch 102 only if its level is above a predetermined threshold, for example, 650 millivolts. If the seismic signal is above this threshold, threshold detector 90 triggers a one-shot multivibrator 94 which in turn generates a 250 millisecond wide pulse at an output labelled $P_1$. The other averagers 44' and 44'' may also generate pulses at $P_2$ and $P_3$ respectively.

The pulses from outputs $P_1$, $P_2$, and $P_3$ are applied as inputs to a logic switch 98 contained is seismic maximum selector 50. The same pulses are also used to gate or enable switches 102, 102', and 102'' in the averagers. Returning to a description of the averager 44, the pulse from one shot 94 gates the $|s_1(t)|$ signal through electronic switch 102 to average and hold element 106. Average and hold element 106 is a circuit which takes the time average of its input signal over a particular period and holds that level until reset. Element 106 has a characteristic time constant. Its output is the time average of the portions of $|s_1(t)|$ which are gated by switch 102. The same is true for each of the other elements 106' and 106''. The outputs of average and hold elements 106, 106' and 106'' are labelled $A_{s1}$, $A_{s2}$, and $A_{s3}$ to indicate that each is the sampled average of the seismic disturbance signal from a particular line segment.

The signals at outputs $A_{s1}$, $A_{s2}$, and $A_{s3}$ of circuits 106, 106' and 106'' are applied to the seismic maximum selector shown in a dashed line block generally designated 50. More particularly, outputs $A_{s1}$, $A_{s2}$, and $A_{s3}$ are connected to a maximum detector 110 included within maximum selector 50. Detector 110 generates a gating signal on one of three output lines 111, 112, or 113 depending on which of its input signals is detected to have the largest magnitude.

The gating signal is applied to logic switch 98 as are pulsed from outputs $P_1$, $P_2$, and $P_3$ previously described. Depending on the line on which the gating signal is present, $P_1$, $P_2$, or $P_3$ triggers the generation of relatively narrow output pulse at an output $P'$ of logic switch 98. As an example, consider the case in which the signal on output $A_{s1}$ is larger than that on outputs $A_{s2}$ or $A_{s3}$. Maximum detector 110 will function to generate a gating signal on the proper line to gate the associated pulses from $P_1$ into logic switch 98 which will effectively direct the pulses from $P_1$ to output $P'$. In this way, only the seismic pulses associated with the line sensor segment with the greatest sampled average level of seismic disturbances appear at the $P'$ output.

The pulses at $P'$ are applied to an input of the control and combination logic block 58 and the time-between-pulse extractor 56. Extractor 56 includes a differentiator 114, a one-shot multivibrator 116, an "AND" gate 118, and a counter 120. The pulses from $P'$ are applied to the input of differentiator 114, the output of which triggers one-shot multivibrator 116. One-shot 116, when triggered, generates a 60 millisecond output pulse. The 60 millisecond pulse from one-shot 116 enables AND gate 118 so that if a second pulses occurs at $P'$ within 60 milliseconds of the first, it passes through AND gate 118 and is counted by counter 120. Counter 120 is set to produce a logic output pulse at an output labelled IM after receiving 9 input pulses. The count of 9 is arbitrarily chosen. The counter range might be from 3–30 counts depending upon the particular application of the system. Thus the generation of a logic pulse by counter 120 means that there have been 9 periods of 60 milliseconds or less between successive $P'$ pulses which indicates a disturbance not sufficiently impulsive, i.e., of too high a repetition rate to represent human intruders. Average & hold circuit 106 and counter 120 are periodically reset by a reset signal labelled "Reset N" from the control and combination logic circuitry 58. This reset establishes a time limit for the averaging of elements 106, 106', and 106'' and prevents accumulation of counts in counter 120 over a long period of time as a result of random disturbances.

Figure 7:
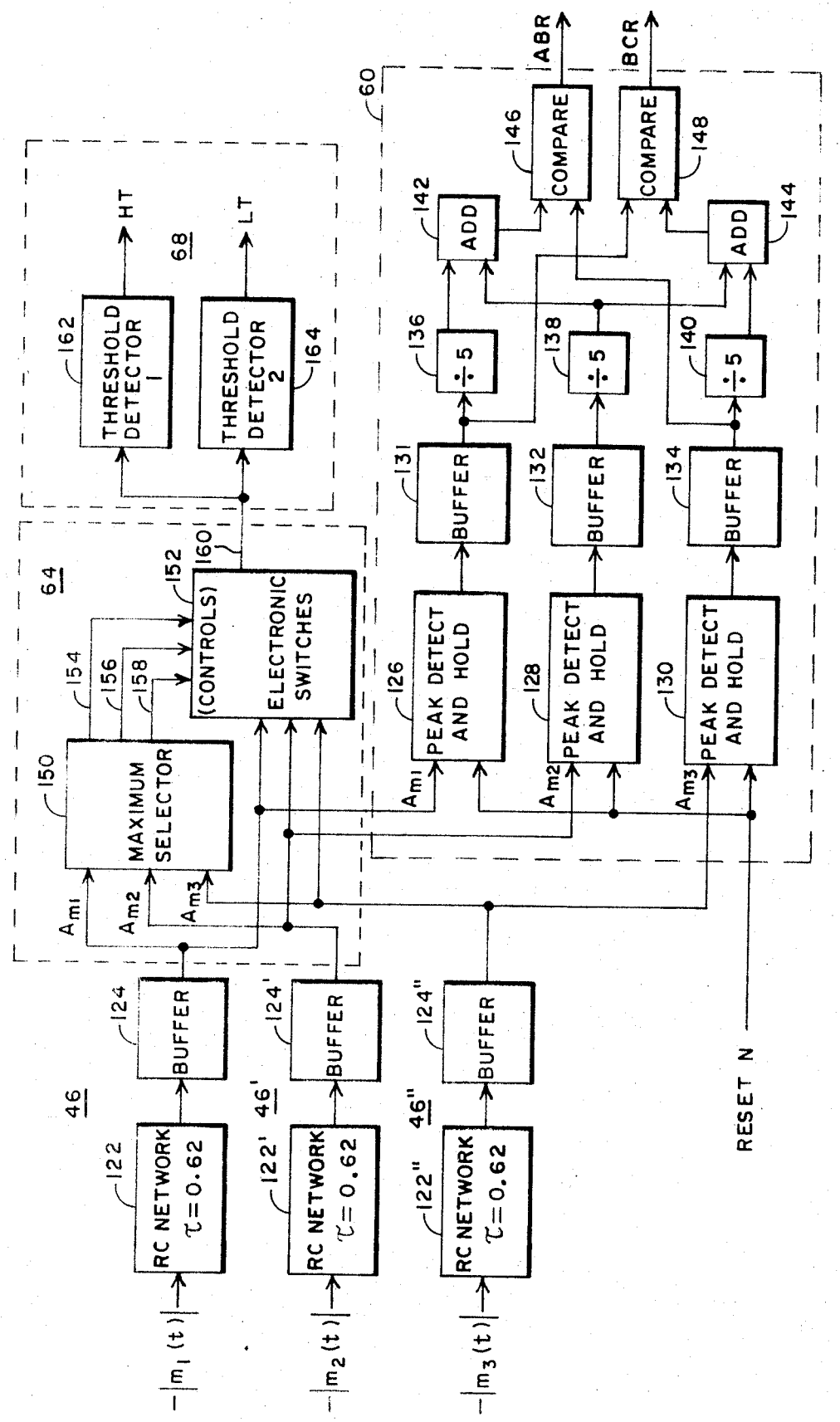
FIG. 7 is a detailed block diagram of the magnetic signal processing portion of the apparatus.

FIG. 7 illustrates, in more detail, the averagers 46, 46', and 46'', as well as the array extractor 60, magnetic maximum selector 64, and amplitude extractor 68 of FIG. 3. Since each of the averagers 46, 46', and 46'' is identical to the others, only averager 46 will be described. Averager 46 comprises an RC network 122, which may have a time constant of approximately 0.62 seconds, and a buffer element 124, which aids in isolating the network output from the remaining circuitry.

The outputs of buffers 124, 124' and 124'' are labelled $A_{m1}$, $A_{m2}$, and $A_{m3}$ to identify their placement in the less specific diagram of FIG. 3. These outputs are connected to each of three peak detect and hold circuits 126, 128, and 130 in the array extractor 60. Each peak detect and hold circuit acquires and holds the highest amplitude of the input signals applied to it. The peak detect and hold circuits are periodically reset by the RESET signal from the control and combination logic block 58 mentioned previously. The outputs of circuits 126, 128, and 130 are isolated from the circuitry that follows by buffer-amplifiers 131, 132, and 134. The outpuput of each of buffers 131, 132, and 134 is applied to one of the divide-by-five elements 136, 138, and 140. Each divide-by-five element provides, at its output, a signal of magnitude equal to one-fifth of the peak signal received. The outputs of elements 136 and 138 are summed by an adder 142 while the outputs of elements 138 and 140 are summed in a second adder 144. The outputs of adder 142 and buffer 134 are then provided as inputs to a comparator 146, while the outputs of adder 144 and buffer 131 are provided to a comparator 148. The outputs of comparator 146 and 148 are the logic signals at outputs labelled ABR and BCR, respectively.

The operation of array extractor 60 is most easily understood by considering an example. Assume the outputs of buffers 131, 132, and 134 are 3.8, 4.0, and 4.2 volts respectively. This corresponds to a disturbance condition where all segments of line sensor 30 are experiencing somewhat similar magnetic disturbances, a condition indicative of far-field rather than localized disturbances. In this case, the outputs of divide-by-five circuits 136, 138, and 140 will be 0.76, 0.80, and 0.84 volts respectively, while the outputs of adder 142 and 144 will be 1.56 and 1.64 volts. Therefore the inputs to comparator 146 are 1.56 volts at the positive input and 4.20 volts at the negative input, resulting in relatively negative or low (L) level output signal at ABR. similarly, the inputs to circuit 148 are 3.80 volts at the negative input and 1.64 volts at the positive input, again resulting in a relatively negative or low (L) level output signal at BCR.

The occurrence of "L" states at both ABR and BCR can be used by control and combination logic block 58 as an inhibit signal, preventing alarm actuation due to far-field effects. However, if one of segments 32, 34, or 36 develops a magnetic signal substantially greater than the other two, at least one of the logic binary output ABR or BCR will change states. For example, if the $A_{m1}$ output from line segment 32 is substantially greater than that from segments 34 or 36, the output of buffer 131 will be substantially greater than that of buffers 132 and 134. This results in a voltage at the positive input of comparator 146 which is greater than that at the negative input and the signal level output ABR becomes relatively high (represented by "H"). FIG. 8 contains a truth table illustrating the states of outputs ABR and BCR which result from disturbances in single segments or pairs of adjacent segments as well as the non-detect condition in which far-field disturbances are assumed to exist.

Turning to a discussion of the magnetic maximum selector 64 as shown in FIG. 7, the outputs $A_{m1}$, $A_{m2}$, and $A_{m3}$ are each connected to one input of a maximum selector element 150, as well as to three inputs of each of a set of three electronic switches 152. Element 150 determines which of signals $A_{m1}$, $A_{m2}$, and $A_{m3}$ is of greatest magnitude and generates a gating signal on one of three output leads 154, 156, and 158. Output leads 154, 156, and 158 are each connected to gating terminals of one of the three switches in block 152. One of the switches 152 is gated or enabled by the gating signal provided via one of the three gating leads and switches to provide, at output 160, the largest of signals from $A_{m1}$, $A_{m2}$, and $A_{m3}$. For example, if the signal from $A_{m2}$ is the largest, element 150 develops a gating signal on one of the output leads, which gating signal is applied to the electronic switch connected to $A_{m2}$. The signal from $A_{m2}$ is thereby switched through block 152 to the input of the amplitude extractor 68.

Amplitude extractor 68 includes two threshold detector elements 162 and 164. Each of these threshold detector elements receives as an input the selected maximum signal transmitted via output 160. If the selected signal is above a first relatively high threshold level, detectors 162 and 164 will both be energized and the logic levels of outputs HT and LT will both be high or "H". If, however, the largest of the signals is below the high threshold level, but above a second relatively low threshold level, only detector 164 will be energized. For this case, HT will have a low level signal while LT will be a high level. Finally, if the largest of the signals is below both threshold levels, neither detector 162 nor detector 164 will be energized. Both detector outputs will transmit low level logic signals.

Figure 9:
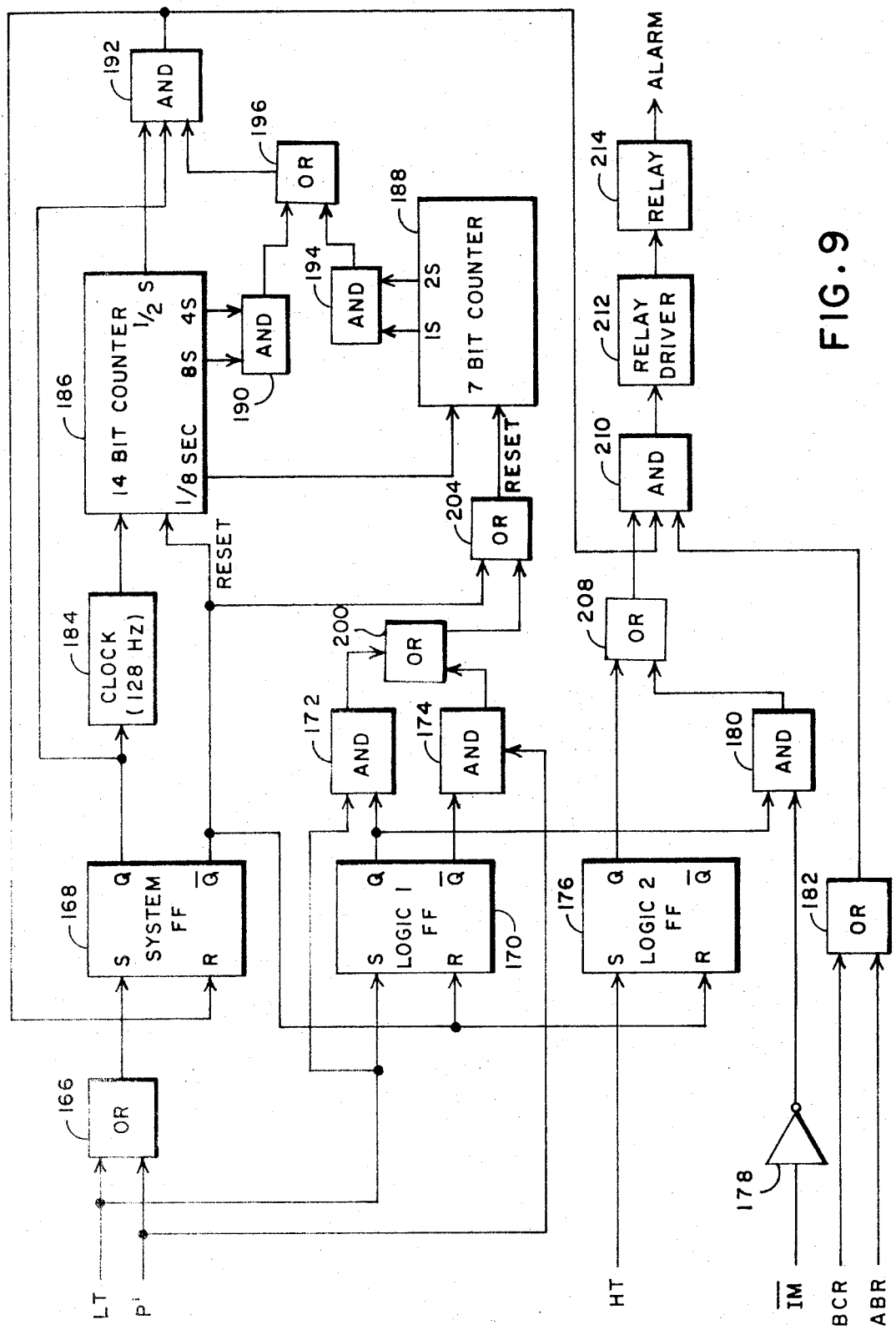
FIG. 9 is a detailed block diagram of the control, combination logic, and output sections of the apparatus.

The control and combination logic block 58 which utilizes the signals and logic levels previously described is shown in some detail in the block diagram of FIG. 9. The input signals to block 58 are the logic level signals from outputs LT, HT, BCR, and ABR as well as logic pulses from output $\overline{IM}$ and pulses from P'.

The signal from output LT is applied to an OR gate 166, the other input of which is connected to P'. The output of OR gate 166 is applied to the set input of flipflop 168. The signal from LT is also the set input of a second flipflop 170 and as one input of a two input AND gate 172. The P' input is further connected to an AND gate 174 which receives the $\overline{Q}$ output of flipflop 170 as a second input. The HT input is connected to a set input of a third flipflop 176. The $\overline{IM}$ output is connected to the input of an inverter 178, the output of which is applied to an AND gate 180. In a logical sense then, the input signal to AND gate 180 represents impulsive or human intrusion due to the inversion. Lastly, signals at BCR and ABR are each applied to OR gate 182.

OR gate 166 sets a flipflop 168 which in trn activates a clock or source of system timing pulses 184. Clock 184, operated at 128 Hz, drives a 14-bit counter 186 used for system time. Counter 186 develops four outputs. An output labelled "⅛ SEC" transmits either pulses each second to an input of a 7-bit counter 188. Two outputs labelled "8S" and "4S'''" overflow every eight and four seconds respectively to provide output pulses as inputs to a two input AND gate 190. The fourth output is labelled "½S" and overflows every half-second to provide one pulse to a three input AND gate 192.

The 7-bit counter 188 in turn has outputs labelled "1S" and "2S" at which pulses are generated every one or two seconds. These outputs are connected as inputs to an AND gate 194. The outputs of AND gates 190 and 194 are each connected as inputs to a two input OR gate 196, which in turn has its output connected as one of the inputs to AND gate 192.

The Q and $\overline{Q}$ outputs respectively of flip-flop 170 are applied to inputs of AND gates 172 and 174, the other inputs of which are connected to P' and LT respectively. The outputs of AND gates 172 and 174 are connected as inputs of an OR gate 200. The output of OR gate 200 together with the $\overline{Q}$ output of flipflop 168 are applied to another OR gate 204 the output of which is used to reset counter 188.

The Q output of the third flipflop 176 is applied to one input of an OR gate 208. The Q output of a second flipflop is applied to one input of AND gate 180, whose output is applied as the second input of OR gate 208.

Three inputs are required to actuate the alarm. These include the output of OR gate 182, the output of OR gate 208 and the output of AND gate 192. Functionally speaking, a low level signal OR gate 182 represents protection against alarm actuation due to far-field disturbances, the output of OR gate 208 represents an exceeded magnetic threshold (upper or lower depending upon the frequency of seismic disturbances), and the output of AND gate 192 represents the system timing control on the alarm. These outputs are applied to a three input AND gate 210. The output of AND gate 210 provides a logic signal to a relay driver circuit 212 to generate an actuate signal for a relay 214 which in turn switches power to the alarm device.

The operation of the circuit may be most easily understood by considering an illustrative situation. Assume a situation in which the disturbances sensed are both magnetic and seismic. Further assume that the level of magnetic disturbances is between the lower and upper thresholds of the amplitude extractor 68, and that the seismic disturbances are sufficiently impulsive (long enough period between peaks) to represent human intrusion. Also assume that the disturbances are not far-field, and that the disturbances are relatively discontinuous, or greater than 3 seconds between impulses. In such a situation, the LT will have a "H" level, a pulse will be present a P', $\overline{IM}$ will have a "L" level, and a high level signal will be present at either $\overline{BCR}$ or $\overline{ABR}$.

Initially, flipflops 168, 170, and 176 will be in the $\overline{Q}$ state, that is with the $\overline{Q}$ outputs at a high or "H" level. Counters 168 and 174 will be reset by the $\overline{Q}$ output of flipflop 168. OR gate 166 sets flipflop 168 either by a signal received at LT or P'. When flipflop 168 is set, the Q output goes to "H" level and actuates clock 184 operating at 128 Hz. The Q output of flipflop 168 is further applied to an input of AND gate 192. Pulses from clock 184 are received at the input of 14-bit counter 186. Counter 186 generates, at the output labelled "⅛ SEC", a set of pulses ⅛ second apart which are applied to the input of 7-bit counter 188. Counter 186 develops another set of pulses ½ second apart which are applied to one input of AND gate 192. Three seconds after beginning to receive the ⅛ second pulses from counter 186, counter 188 has developed output pulses at "1S" and "2S", each of which is applied to AND gate 194. The output of AND gate 194 is applied to one input of OR gate 196. The OR gate 196 has its output connected to the last input of AND gate 192. Thus, three seconds after receiving a signal from LT or P', an "H" or high level logic signal is developed by AND gate 192 and applied to one input of AND gate 210.

It will be understood that the LT signal also sets flipflop 170, causing a high level or "H" signal at its Q output. The Q output is applied to one input of AND gate 180. The inverted signal from output $\overline{IM}$ is applied to the other input of AND gate 180. AND gate 180 develops a high level output signal since the seismic disturbance is impulsive. This allows the high level signal at the Q output of flipflop 170 (created by the LT signal) to reach OR gate 208 and finally AND gate 210. It will be apparent that if the seismic disturbance had been non-impulsive, the high level signal created by the LT output would not have been gated through AND gate 180.

The $\overline{ABR}$ and $\overline{BCR}$ outputs are connected to the inputs of OR gate 182. Since it has been assumed that the disturbances are not "far-field", at least one of these inputs will be high level. This will provide OR gate 182 with a high level output which will be transmitted as the third input to AND gate 210. AND gate 210, being supplied with three high level logic signals will transmit a high level signal at its output which will ultimately actuate the alarm.

If seismic and magnetic disturbances are continuous (less than 3 seconds apart) rather than discontinuous (more than 3 seconds apart) counter 188 will be reset before the 1S and 2S output signals have both been developed. The resetting of counter 188 which takes place with continuous disturbances from P' and LT is effected by AND gates 172 and 174 in conjunction with OR gates 200 and 204. If a second LT signal is received less than 3 seconds after the first, a reset signal is generated by AND gate 172, OR gate 200, and OR gate 204. If a second P' signal is received less than three seconds after the first, the reset signal is effected by elements 174, 200, and 204. If these disturbances are continuous and counter 188 is reset, counter 186 will eventually develop output signals 4S and 8S after 12 seconds of continuous disturbance. In this case the output of AND gate 190 will substitute for that of AND gate 194 at OR gate 196. Thus, at the end of 12 seconds of continuous disturbance, high level signals will be applied to all the inputs of AND gate 192 and an output signal is developed and transmitted to AND gate 210 in a manner previously discussed.

In situations where magnetic disturbances are strong enough to trip the upper threshold yet the seismic disturbances are non-impulsive, the signal from HT sets flipflop 176. The Q output of flipflop 176, which goes high, is applied to OR gate 208. The output of OR gate 208 is applied to the one input of AND gate 210 and an alarm is generated. This represents situations in which the level of magnetic disturbance is so high that alarm is desirable, even though the frequency of seismic disturbances is higher than that normally associated with human intrusion.

Thus it is apparent that there has been provided, in accordance with the invention, improved signal processing apparatus for an instrusion detection system which fully satisfied the aims, objects, and advantages set forth above. While the invention has been described in conjunction with specific embodiments of certain of its elements, many alternatives, modifications, and variations will be apparent to those of skill in the art in light of this description. Accordingly, it is intended to embrace all such alternatives, modifications and variations as fall within the spirit and broad scope of the appended claims.

What is claimed is:

1. Intrusion detection apparatus for processing a plurality of sensor signals, each of which is indicative of the level of magnetic disturbances in a distinct segment of a predetermined segmented boundary, comprising:

averaging means for receiving said sensor signals, and producing a plurality of output signals which are the time averages thereof;

array extractor means connected to receive said output signals from said averaging means and responsive thereto to compare the relative amplitudes of the signals received with one another, said array extractor means generating an inhibit signal if the relative amplitudes are within a predetermined range;

threshold detection means, responsive to said averaged sensor signals for detecting when one of said averaged sensor signals exceeds a predetermined threshold amplitude, and upon such detection generating an activate signal; and alarm control logic, associated with said threshold detection means and said array extractor means, and operable to produce an alarm actuation signal at times when said activate signal is generated by said threshold detection means and said inhibit signal is not being generated by said array extractor means.

2. The apparatus of claim 1 wherein at least three sensor signals are received for processing, said averaging means generates at least three output signals, and said array extractor means receives and compares said three output signals.

3. The apparatus of claim 1 wherein said array extractor means receives at least three averaging means output signals and determines whether or not any one of the three received signals has a magnitude substantially greater or substantially smaller than the other two.

4. The apparatus of claim 2 wherein said array extraction means compares relative amplitudes using the criteria $A_{m1} > (A_{m2} + A_{m3})/(K)$
$A_{m3} > (A_{m2} + A_{m1})/(K)$ where $A_{m1}$, $A_{m2}$, and $A_{m3}$ represent output signals from said averaging means, and K is a positive number greater than or equal to one, and upon satisfaction of both criteria, said array extractor means generates an inhibit signal.

5. The apparatus of claim 4 wherein the criteria used by said array extraction means are further defined by selecting K substantially equal to 5.

6. The apparatus of claim 1 in combination with
transmission means for receiving a seismic signal indicative of seismic disturbances along said boundary;
time-between-pulse means, connected to said transmission means, for processing said seismic signal to determine whether the frequency at which said seismic threshold exceeds a predetermined threshold level is above a given value, said time-between-pulse means generating a logic signal if said frequency is above the given value; and
control means responsive to said logic signal to increase said threshold amplitude at which said threshold detection means generates an activate signal to a higher value.

7. The apparatus of claim 6 wherein said threshold detection means includes
a first level detector for detecting when sensor signals which exceed a first predetermined amplitude and generating a first switching signal upon such detection;
a second level detector for detecting when sensor signals which exceed a second, higher predetermined amplitude and generating a second switching signal upon such detection; and
an activate signal generator responsive to said first switching signal to generate said activate signal in the absence of said logic signal, and responsive to said second switching signal to generate said activate signal in the presence of said logic signal.

8. Improved intrusion detection apparatus utilizing seismic and magnetic disturbance information, comprising in combination:
seismic sensor means responsive to seismic disturbances in each of a plurality of locations along a predetermined boundary to produce a plurality of seismic sensor signals each of which is indicative of the disturbance in a distinct location;
magnetic sensor means producing a signal indicative of the magnetic disturbances in one location along a predetermined boundary;
seismic maximum means which receives said plurality of seismic sensor signals, and selects the largest average amplitude seismic sensor signal;
a seismic signal frequency detector responsive to said largest average amplitude seismic sensor signal to detect whether the frequency of disturbances above a predetermined intensity represented thereby is below a predetermined frequency level;
logic means responsive to said magnetic sensor means signal to trip and provide an alarm actuation signal when said magnetic sensor means signal exceeds a first predetermined amplitude; and
control means responsive to said seismic signal frequency detector to adjust the logic means to trip at a second higher predetermined amplitude in the event that the frequency detected by said seismic signal frequency detector exceeds said predetermined frequency level.

9. The apparatus of claim 8 wherein said seismic signal frequency detector includes a plurality sampled averager elements, each of which receives one of said seismic sensor signals and generates at a first output, a pulse each time the amplitude of the seismic sensor signal received exceeds a said predetermined intensity, said sampled averager element further operable to provide at a second output, a signal which is the time average of the amplitude of those portions of said seismic sensor signal received above said predetermined intensity, and a time-between-pulse extractor connected to said first output of one of said sampled averager elements.

10. The apparatus of claim 9 wherein said seismic sensor means comprises a plurality of independent sensor elements; the center of the area covered by each element being at least thirty feet from the center of the area covered by each other element.

11. The apparatus of claim 10 wherein said seismic sensor means and magnetic sensor means further comprise a segmented line sensor, having three segments, each segment of which generates a combined signal indicative of seismic and magnetic disturbances in the location covered by that segment.

12. The apparatus of claim 11 and filter means operative associated with said line sensor segments for separating the portion of said combined signal representative of seismic disturbances from that portion representative of magnetic disturbances.

* * * * *